H. WINTER.
APPARATUS FOR PRODUCING STEREOTYPE MATRICES.
APPLICATION FILED OCT. 2, 1907.
948,655.
Patented Feb. 8, 1910.
2 SHEETS—SHEET 1.
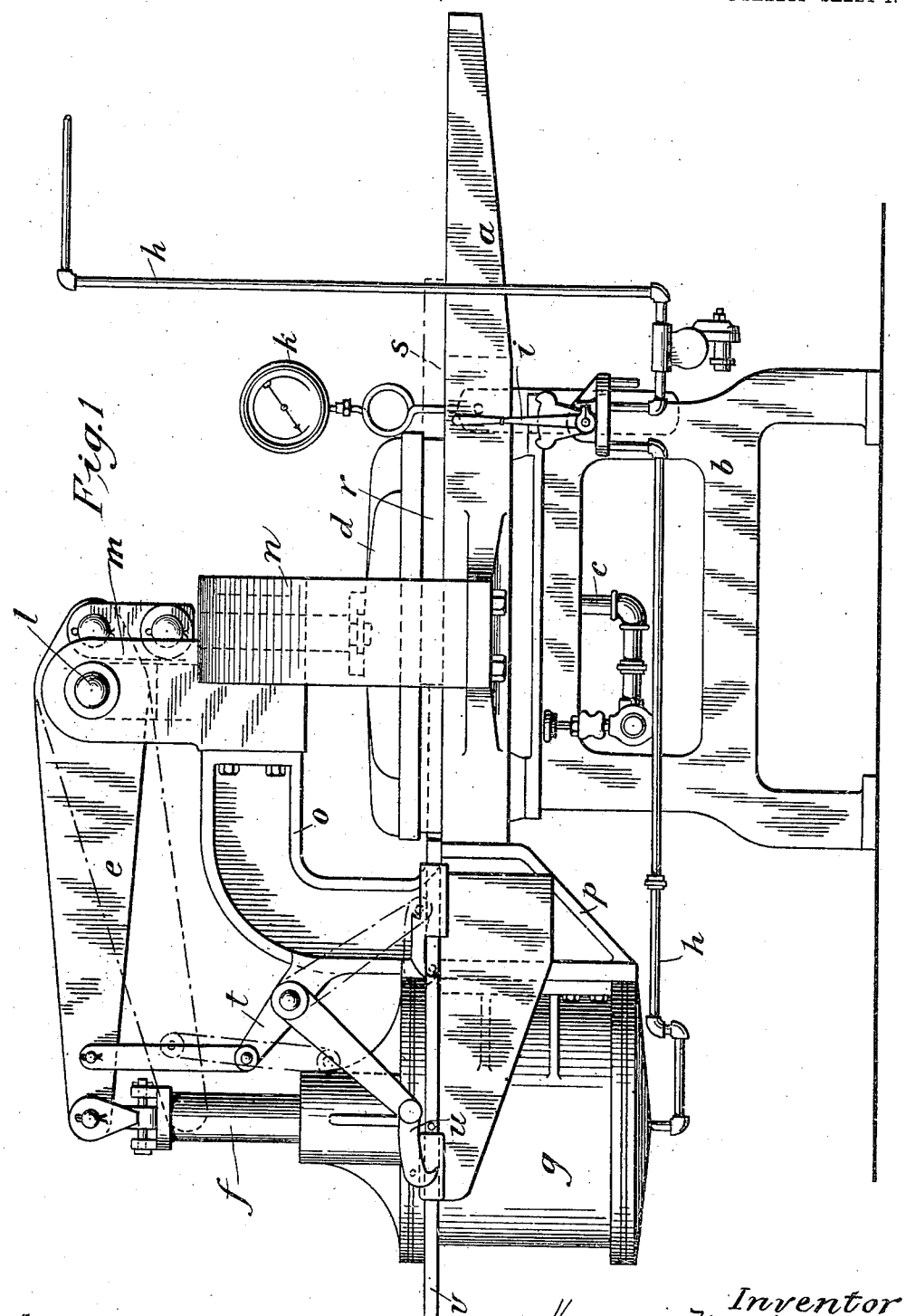

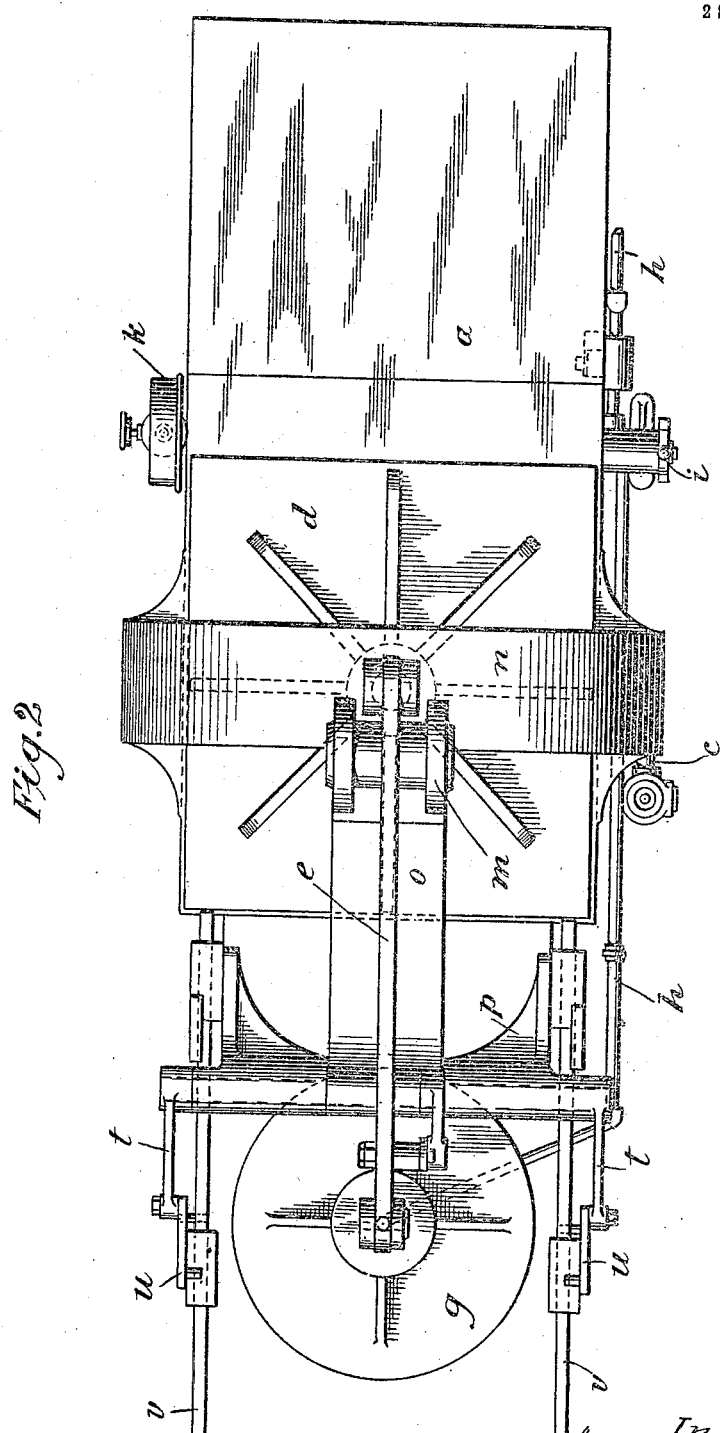

UNITED STATES PATENT OFFICE.

HERMAN WINTER, OF NEW YORK, N. Y., ASSIGNOR TO F. WESEL MANUFACTURING COMPANY, OF BROOKLYN, NEW YORK, A CORPORATION OF NEW YORK.

APPARATUS FOR PRODUCING STEREOTYPE-MATRICES.

948,655.  Specification of Letters Patent.  Patented Feb. 8, 1910.

Application filed October 2, 1907. Serial No. 395,540.

*To all whom it may concern:*

Be it known that I, HERMAN WINTER, a citizen of the United States, and a resident of the borough of Brooklyn, in the city of New York and State of New York, have invented certain new and useful Improvements in Apparatuses for Producing Stereotype-Matrices, of which the following is a specification, reference being had to the accompanying drawings, forming a part hereof.

The object of the invention is to provide an apparatus in which stereotype matrices and the like can be made most expeditiously and conveniently.

Heretofore it was customary to apply the forming pressure to the matrix material by pounding or rolling the matrix sheet upon the form, and then the form and matrix sheet were transferred to a drying table where pressure was applied, generally by means of a platen operated by a hand wheel, in order to squeeze out the superfluous water and hold the matrix sheet upon the form until it was entirely dry and ready to be stripped from the form. The pounding or rolling, to make the matrix sheet conform to the type, the transferring of the type and matrix sheet to the drying table, and the application of pressure to the matrix sheet through the medium of a hand wheel press are particularly tedious and time consuming operations for the workmen, and considerable care, moreover, has to be taken in order not to distort the matrix sheet, after the forming pressure has been applied and while the sheet is still wet and soft.

In accordance with the present improvements the old pounding and rolling in order to form the matrix sheet is entirely done away with, and the formation of the sheet is undertaken upon the drying table, so that no transferring of the matrix sheet and form is required from one place to another during the production thereof. Moreover, there is no danger of distorting the matrix after it is formed, for the reason that the forming pressure is maintained in the present machine until the matrix is dry and stiff. The improvements embody a drying table with a large platen above the same big enough to cover the entire matrix sheet at once and a fluid pressure cylinder which develops a sufficient pressure to effect through the platen the formation of the matrix without any pounding or rolling. A massive frame is preferably secured above the table and a lever is pivoted in this frame the longer arm of which is secured to the piston of the cylinder and the shorter arm to the platen. After the matrix is finished, the matrix and form are pushed out from underneath the platen toward the front of the table by means of mechanism which will be described more fully hereinafter.

In the drawings,—Figure 1 is a view in side elevation of an apparatus which may be employed, in practicing the improved process, and, Fig. 2 is a plan view of the same.

Referring to the drawings the reference character $a$ indicates the smooth top plate of a drying table which is provided with a suitable base $b$ in which are arranged steam pipes $c$ or other devices for producing considerable heat directly underneath the plate $a$. Directly above the drying table is a pressure platen $d$ which is operatively connected by means of a lever $e$ and piston rod $f$, with the piston of a fluid pressure cylinder $g$. The construction of the cylinder $g$ is immaterial to the present invention and it is also immaterial what kind of fluid be supplied to the cylinder $g$ to develop the pressure. In the particular apparatus illustrated in the present drawings, the cylinder $g$ adapted for pneumatic pressure which is supplied from some convenient source through a pipe $h$, a controller $i$ and gage $k$ being located at some convenient point in the pipe $h$ so as to be accessible to the operator. The lever $e$ is provided with a very long power arm and a very short weight arm, being pivoted at $l$ in a bracket $m$ which extends upwardly from a massive frame $n$ which rises above the platen in the form of a yoke and is secured to the plate $a$ upon each side of the platen. This frame has also a backwardly extending member $o$ which is connected to a massive bracket $p$ which sustains the cylinder $g$. By means of such a construction it is possible to apply an enormous power through the platen $d$ to the work between the platen $d$ and the table $a$.

With the platen $d$ slightly raised the chase of type or other form with the matrix sheet upon the top thereof is moved underneath the platen. This form and matrix is indicated by the reference character $r$, and is also indicated by the broken line $s$ which illustrates its position after it has been shoved out from underneath the platen by an automatic mechanism which is described below.

When the form and matrix sheet have been moved underneath the platen, the operator moves the controller $i$ to admit the pressure fluid into the cylinder $g$ thereby causing the platen $d$ to be brought down forcibly yet gradually upon the top of the matrix sheet and to cause the matrix sheet to receive the impression of the form underneath the same. At the same time the superfluous water is squeezed out from the matrix sheet and the heating means for the drying table is set in operation, if these means have not already been set in operation before the process was commenced. The platen is allowed to remain pressing forcibly down upon the matrix sheet until the latter has become substantially dried and is ready to be removed from the form. In other words, the forming pressure for the matrix is maintained until the matrix is sufficiently hard so that it is impossible to spoil the same by distorting it subsequent to the forming pressure and while still soft. When the matrix has dried, the operator again moves the handle $i$ to permit the pressure to exhaust itself from the cylinder $g$ whereupon the platen is raised and the form with the matrix thereon is shoved out of the machine.

The means for shoving the matrix and form from between the table and platen are preferably provided so as to relieve the operator from reaching in underneath the platen to pull the work out, which operation is not only dangerous but is more or less clumsy for the operator. These means comprise a bell crank lever $t$ pivoted on the member $o$ and one arm of which is provided with hooks $u$ to engage a sliding frame, consisting of two rods $v$ in the present case, which are arranged to move forward under the pull of the hooks and engage the work and thus slide or shove it out from under the platen onto the forward portion of the table. The other arm of the lever $t$ has a link connection with the lever $e$ near the end where this lever is connected to the piston rod $f$, so that the lever $t$ is moved with the piston and serves, as the piston drops upon relieving the pressure in the cylinder, to actuate the hooks to slide the frame $v$ forward. The frame is moved back again by the next piece of work inserted in the machine and the hooks are returned to their first position by the lifting of the piston when the power is again applied.

Various changes may be made in the construction shown and described without departing from the spirit of the invention.

I claim as my invention:

1. In an apparatus for producing stereotype matrices, the combination of a table, a platen coöperating therewith, a fluid pressure cylinder operatively connected with the platen, and means to discharge the work from between the table and platen, said means being connected with the piston of the cylinder so as to move therewith.

2. In an apparatus for producing stereotype matrices, the combination of a table, a platen coöperating therewith, means to apply pressure through the platen, a sliding frame to eject the work from between the table and platen, and a bell crank lever provided with hooks to engage the frame to move the same.

3. In an apparatus for producing stereotype matrices, the combination with a table a platen coöperating therewith, a fluid pressure cylinder, a sliding frame to eject the work from between the table and platen, and a bell crank lever provided with hooks to engage the frame and being connected with the piston of the cylinder so as to move the frame when the pressure is released from the cylinder.

This specification signed and witnessed this 28th day of September, A. D., 1907.

HERMAN WINTER.

Signed in the presence of—
C. H. MERRITT,
ALFRED W. KIDDLE.